(12) United States Patent
Kim et al.

(10) Patent No.: US 12,516,641 B2
(45) Date of Patent: Jan. 6, 2026

(54) APPARATUS AND METHOD FOR CONTROLLING FUEL SYSTEM OF VEHICLE

(71) Applicants: Hyundai Motor Company, Seoul (KR); Kia Corporation, Seoul (KR)

(72) Inventors: Keun Soo Kim, Anyang-Si (KR); Seung Yub Lee, Gwangmyeong-Si (KR); Cheol Lee, Suwon-Si (KR); Jung Hoon Park, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/885,225

(22) Filed: Sep. 13, 2024

(65) Prior Publication Data

US 2025/0270966 A1    Aug. 28, 2025

(51) Int. Cl.
F02D 41/00    (2006.01)

(52) U.S. Cl.
CPC .... *F02D 41/004* (2013.01); *F02D 2200/1002* (2013.01); *F02D 2200/501* (2013.01); *F02D 2200/602* (2013.01); *F02D 2200/70* (2013.01)

(58) Field of Classification Search
CPC .......... F02D 41/004; F02D 2200/1002; F02D 2200/501; F02D 2200/602; F02D 2200/70
See application file for complete search history.

(56) References Cited

U.S. PATENT DOCUMENTS

| | | | |
|---|---|---|---|
| 6,196,203 B1* | 3/2001 | Grieve | F02M 25/08 123/198 D |
| 7,453,271 B2 | 11/2008 | Straub | |
| 9,845,745 B2* | 12/2017 | Dudar | F02D 41/0045 |
| 9,982,623 B2* | 5/2018 | Kim | F02D 41/3082 |
| 10,337,464 B2* | 7/2019 | Dudar | F02M 25/089 |
| 10,914,250 B2* | 2/2021 | Kim | F02D 41/004 |

(Continued)

FOREIGN PATENT DOCUMENTS

| | | |
|---|---|---|
| CN | 106593717 A | 4/2017 |
| JP | H 11107782 A | 4/1999 |
| JP | 2019-173567 A | 10/2019 |

(Continued)

*Primary Examiner* — Grant Moubry
(74) *Attorney, Agent, or Firm* — Morgan Lewis & Bockius LLP

(57) ABSTRACT

In an apparatus and method for controlling a fuel system of a vehicle, the apparatus includes driving information detectors provided to detect vehicle driving information required to determine whether the vehicle is driving while fording water, a controller operably connected to the driving information detectors and provided to determine whether a current driving state of the vehicle satisfies predetermined water-fording driving conditions based on the vehicle driving information, a canister close valve provided on an atmospheric line, and a purge control solenoid valve provided on a purge line, the controller is configured to determine that the vehicle is in a water-fording driving state and outputs a control signal to seal the fuel system, upon determining that the current driving state satisfies the predetermined water-fording driving conditions, and the canister close valve and the purge control solenoid valve are controlled to be in a closed state depending on the control signal to seal the fuel system.

19 Claims, 5 Drawing Sheets

(56) References Cited

U.S. PATENT DOCUMENTS

2013/0144506 A1    6/2013  Nam
2014/0311461 A1*  10/2014  Dudar ................ F02M 25/0818
                                                                  123/520

FOREIGN PATENT DOCUMENTS

| KR | 2016-0037429 A | 4/2016 |
| KR | 2018-0069483 A | 6/2018 |

* cited by examiner

APPARATUS AND METHOD FOR CONTROLLING FUEL SYSTEM OF VEHICLE

CROSS-REFERENCE TO RELATED APPLICATION

The present application claims priority to Korean Patent Application No. 10-2024-0026172 filed on Feb. 23, 2024, the entire contents of which is incorporated herein for all purposes by this reference.

BACKGROUND OF THE PRESENT DISCLOSURE

Field of the Present Disclosure

The present disclosure relates to an apparatus and method for controlling a fuel system of a vehicle which may effectively prevent water from flowing into an engine through the fuel system during water-fording driving of the vehicle.

Description of Related Art

In general, a vehicle fuel system includes a fuel tank configured to store fuel, a fuel pump module configured to deliver the fuel stored in the fuel tank to supply the fuel to an engine, a fuel filter configured to remove foreign substances from the fuel supplied to the engine, and fuel lines, such as a fuel supply line and a fuel return line, through which the fuel is transferred.

Furthermore, the vehicle fuel system further includes a fuel evaporation gas treatment device configured to treat and control fuel evaporation gas (HC gas) generated from the fuel tank. FIG. 1 is a schematic diagram showing the configuration of a fuel evaporation gas treatment device.

In FIG. 1, reference numeral '1' represents a fuel tank, reference numeral '2' represent a fuel pump module installed in the fuel tank 1, and reference numeral '3' represents a filler neck assembly configured to inject fuel into the fuel tank 1.

As shown in the present figure, the fuel evaporation gas treatment device includes a canister 10 which adsorbs and collects fuel evaporation gas generated from the inside of the fuel tank 1, an air filter 13 which removes foreign substances from air drawn into the canister 10, a canister close valve (referred to hereinafter as "CCV") 12 which opens or closes a conduit (atmospheric line) 11 between the canister 10 and the air filter 13, and a purge control solenoid valve (referred to hereinafter as "PCSV") 15 which opens or closes a conduit (purge line) 14 between the canister 10 and an engine intake system 4 or controls the opening amount of the conduit 14.

To describe the respective elements in more detail, gas due to evaporation of fuel, i.e., the fuel evaporation gas, including fuel components, such as hydrocarbons (HC), is generated from the inside of the fuel tank 1. Therefore, to prevent atmospheric pollution due to the fuel evaporation gas generated from the inside of the fuel tank 1, the canister 10 configured to collect and store the fuel evaporation gas from fuel tank 1 is installed in a vehicle.

As is known, the fuel evaporation gas is generated in the fuel tank 1, and the fuel evaporation gas generated from the inside of the fuel tank 1 is moved from the fuel tank 1 to the canister 10 through a grade vent valve (GVV) 5.

The canister 10 is configured so that the inside of a case thereof is filled with an adsorbent material capable of adsorbing the fuel evaporation gas moved from the fuel tank 1, and activated carbon is widely used as the adsorbent material. Activated carbon functions to adsorb hydrocarbons (HC), which are fuel components, among the fuel evaporation gas introduced into the case of the canister 10.

The canister 10 adsorbs the fuel evaporation gas to the adsorbent material in the stopped state of an engine. On the other hand, when the engine runs, the canister 10 desorbs the fuel evaporation gas from the adsorbent material by the pressure of air drawn from the outside thereof (atmosphere), and the desorbed gas together with air is supplied to the engine intake system.

An operation of drawing the fuel evaporation gas collected by the canister 10 into the engine is referred as a purge operation, and the gas drawn from the canister 10 into the engine is referred to as purge gas. The present purge gas may be said to be a mixture including the fuel components, such as hydrocarbons (HC) desorbed from the adsorbent material of the canister 10, and air.

The PCSV 15 is installed to control the purge operation on the purge line 14, which is the conduit connecting the canister 10 and the engine intake system 4, and is opened during the purge operation while the engine is running. Accordingly, the fuel evaporation gas generated from the inside of the fuel tank 1 is collected in the canister 10, is purged to the engine intake system 4 through the PCSV 15 which is opened while the engine is running, and is burned in the engine.

The PCSV 15 may be controlled by a controller, which is not shown, for example, an engine management system (EMS). To control the fuel evaporation gas, the controller performs control of opening or closing the PCSV 15 (turning on or off the purge operation) depending on the driving state of the vehicle, or controlling the opening amount of (i.e., the flow rate of gas passing through) the PCSV 15.

To further explain the configuration of the canister 10, the canister 10 includes the case filled with the adsorbent material (e.g., activated carbon). The case includes a loading port 10a connected to the fuel tank 1 to cause the fuel evaporation gas from the fuel tank 1 to flow into the case, a purge port 10b connected to the engine intake system 4 to supply the fuel evaporation gas to the engine, and an atmospheric port 10c connected to the air filter (canister filter) 13 to cause air in the atmosphere to be drawn into the case.

The loading port 10a of the canister 10 is connected to the fuel tank 1 through a loading line 16, and the purge port 10b of the canister is connected to the engine intake system 4 through the purge line 14. The atmospheric line (vent line) 11, which is a conduit connected to the air filter 13, is connected to the atmospheric port 10c of the canister 10.

A partition wall 10d, which divides a space where the atmospheric port 10c is located and a space where the purge port 10b and the loading port 10a are located from each other, is provided in the internal space of the case. Accordingly, the fuel evaporation gas introduced into the canister 10 from the fuel tank 1 through the loading port 10a passes along the internal space partitioned by the partition wall 10d, so that hydrocarbons (HC), which are the fuel components, are adsorbed to the adsorbent material.

Furthermore, when the PCSV 15 is opened by the controller while the engine is running and suction pressure, i.e., engine negative pressure, is applied to the internal space of the canister 10 from the engine intake system 4 through the purge port 10b, external air is drawn through the air filter 13, the CCV 12, and the atmospheric port 10c, and gas desorbed from the adsorbent material by the external air is discharged together with air through the purge port 10c, and is drawn into the engine intake system 4.

Because the CCV 12 is always open except when diagnosing a leak in the fuel system, external air may be drawn through the air filter 13 and the CCV 12, and may then be introduced into the engine intake system 4 via the canister 10.

To perform the purge operation in which the fuel components, such as hydrocarbons, are desorbed from the adsorbent material in the canister 10 and are then drawn into the engine intake system 4, engine negative pressure may be applied to the canister 10 through the purge line 14 and the purge port 10b.

Meanwhile, the CCV 12 is a valve used only when diagnosing a leak in the fuel system, and is always kept open except when diagnosing a leak. When diagnosing a leak in the fuel system, a signal from a pressure sensor, which detects a pressure in the fuel tank 1, is used, and in the instant case, the pressure in the fuel tank 1 is raised in a state in which the CCV 12 and the PCSV 15 are closed, and thereafter, only the PCSV 15 is opened to check whether negative pressure in the fuel tank 1 is properly formed.

That is, if the pressure in the fuel tank 1 does not fall within a specified slope range (if a pressure drop slope is less than the specified slope range) in a negative pressure formation section where negative pressure is formed in the fuel tank 1 due to engine negative pressure by opening only the PCSV 15 in the closed state of the CCV 12, it may be determined that a large leak has occurred in the fuel tank 1.

Furthermore, even after the pressure in the fuel tank 1 drops to a relatively normal level, if the rise slope of the pressure in the fuel tank is greater than a specified slope range in a pressure recovery section where the pressure in the fuel tank rises again in the state in which the CCV 12 and the PCSV 15 are closed again, it may be determined that a slight leak has occurred in the fuel tank 1.

In the present way, the CCV 12 is closed when diagnosing a leak in the fuel system, but is always opened except when diagnosing a leak in the fuel system, and thus, water may flow into the fuel tank 1 through the CCV 12.

For example, when the vehicle is driving while fording water, i.e., crosses a river or passes through a point where a water level is high, water passed through the CCV 12 may flow into the fuel tank 1 via the canister 10, and when water flows into the fuel tank 1, there is a possibility that water will flow from the fuel tank 1 into the engine. If water flows into the engine and thus the engine stalls, the engine may be replaced or the vehicle may be scrapped.

Accordingly, the vehicle secures water-fording performance to prevent water from flowing into the vehicle even if the vehicle passes through water up to a set water level, but if the vehicle drives while fording water under conditions in which water exceeds the set water level, water may flow into the fuel tank 1 through the CCV 12 and the canister 10 even if water does not flow into the engine.

Moreover, if cargo is loaded in the vehicle, the height of a vehicle body is lowered and thus the height of parts included in the fuel evaporation gas treatment device is also lowered, and water may enter the inside of the fuel tank 1 through the CCV 12 and the canister 10. If water flows into the fuel tank 1, a possibility that water flows into the engine through the fuel line may be increased.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus and method for controlling a fuel system of a vehicle which may effectively prevent water from flowing into an engine tank through a CCV and a canister, and may further prevent water from flowing into an engine through the fuel tank, during water-fording driving of the vehicle.

The objects of the present disclosure are not limited to the above-mentioned objects, and other objects not mentioned herein will be clearly understood by a person of ordinary skill in the art to which the present disclosure pertains (referred to as "a person skilled in the art") from the following description.

In one aspect, the present disclosure provides an apparatus for controlling a fuel system of a vehicle, including driving information detectors provided to detect vehicle driving information required to determine whether the vehicle is driving while fording water, a controller operably connected to the driving information detectors and provided to determine whether a current driving state of the vehicle satisfies predetermined water-fording driving conditions based on the vehicle driving information detected by the driving information detectors, a canister close valve provided on an atmospheric line between a canister and an atmospheric side, and a purge control solenoid valve provided on a purge line connecting the canister and an engine intake system, wherein, upon concluding that the current driving state of the vehicle satisfies the predetermined water-fording driving conditions, the controller is configured to determine that the vehicle is in a water-fording driving state and outputs a control signal to seal the fuel system, and the canister close valve and the purge control solenoid valve are controlled to be in a closed state depending on the control signal to seal the fuel system, output by the controller.

In an exemplary embodiment of the present disclosure, the vehicle driving information detected by the driving information detectors may include a vehicle speed, a gradient of a place where the vehicle is driving, and a driver's accelerator pedal input value, and the driving information detectors may include a vehicle speed sensor configured to detect the vehicle speed, a gradient sensor configured to detect the gradient of the place where the vehicle is driving, and an accelerator position sensor configured to detect the driver's accelerator pedal input value.

In another exemplary embodiment of the present disclosure, the predetermined water-fording driving conditions set in the controller may include an engine torque condition in which an engine torque configured to satisfy a driver's requested torque exceeds a predetermined torque, a vehicle speed condition in which the detected vehicle speed is less than a predetermined vehicle speed, a gradient condition in which the detected gradient is less than a predetermined gradient, and an accelerator pedal input value condition in which the detected driver's accelerator pedal input value exceeds a predetermined acceleration value.

In yet another exemplary embodiment of the present disclosure, if all of the engine torque condition, the vehicle speed condition, the gradient condition, and the accelerator pedal input value condition are satisfied, the controller may be configured to conclude that the current driving state of the vehicle satisfies the predetermined water-fording driving conditions.

In yet another exemplary embodiment of the present disclosure, the vehicle driving information detected by the driving information detectors may include a vehicle speed, a gradient of a place where the vehicle is driving, a driver's accelerator pedal input value, and a water level of the place where the vehicle is driving, and the driving information detectors may include a vehicle speed sensor configured to detect the vehicle speed, a gradient sensor configured to detect the gradient of the place where the vehicle is driving, an accelerator position sensor configured to detect the driver's accelerator pedal input value, and a water level sensor configured to detect the water level of the place where the vehicle is driving.

In still yet another exemplary embodiment of the present disclosure, the predetermined water-fording driving conditions set in the controller may include an engine torque condition in which an engine torque configured to satisfy a driver's requested torque exceeds a predetermined torque, a vehicle speed condition in which the detected vehicle speed is less than a predetermined vehicle speed, a gradient condition in which the detected gradient is less than a predetermined gradient, an accelerator pedal input value condition in which the detected driver's accelerator pedal input value exceeds a predetermined acceleration value, and a water level condition in which the detected water level is equal to or greater than a set water level.

In a further exemplary embodiment of the present disclosure, if all of the engine torque condition, the vehicle speed condition, the gradient condition, and the accelerator pedal input value condition are satisfied, or if the water level condition is satisfied, the controller may be configured to conclude that the current driving state of the vehicle satisfies the predetermined water-fording driving conditions.

In another further exemplary embodiment of the present disclosure, if a state in which the current driving state of the vehicle satisfies the predetermined water-fording driving conditions is maintained for a first set time, the controller may be configured to determine that the vehicle is in the water-fording driving state.

In yet another further exemplary embodiment of the present disclosure, if the controller determines that the vehicle is in the water-fording driving state, the controller may first control the purge control solenoid valve to be in the closed state, and may be configured for controlling the canister close valve to be in the closed state, after a second set time has elapsed.

In one aspect, the present disclosure provides a method of controlling a fuel system of a vehicle, including obtaining, by a controller, vehicle driving information required to determine whether the vehicle is driving while fording water through driving information detectors, determining, by the controller, whether a current driving state of the vehicle satisfies predetermined water-fording driving conditions based on the obtained vehicle driving information, determining, by the controller, that the vehicle is in a water-fording driving state and outputting a control signal to seal the fuel system, upon concluding that the current driving state of the vehicle satisfies the predetermined water-fording driving conditions, and controlling a canister close valve provided on an atmospheric line between a canister and an atmospheric side and a purge control solenoid valve provided on a purge line connecting the canister and an engine intake system to be in a closed state depending on the control signal output by the controller.

Other aspects and exemplary embodiments of the present disclosure are discussed infra.

The above and other features of the present disclosure are discussed infra.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
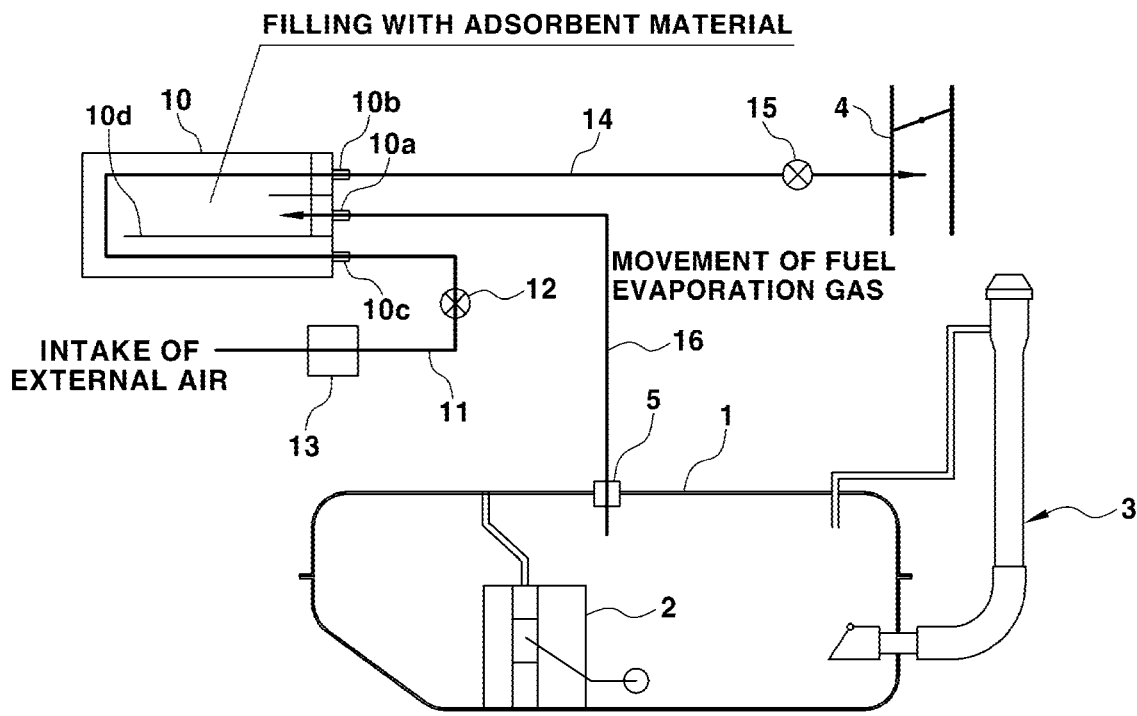
FIG. 1 is a schematic diagram showing a conventional fuel system.

It should be understood that the appended drawings are not necessarily to scale, presenting a somewhat simplified representation of various exemplary features illustrative of the basic principles of the present disclosure. The specific design features of the present disclosure as included herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter reference will be made in detail to various embodiments of the present disclosure, examples of which are illustrated in the accompanying drawings and described below. Specific structural or functional descriptions in embodiments of the present disclosure set forth in the description which follows will be exemplarily provided to describe the embodiments of the present disclosure, and the present disclosure may be embodied in many alternative forms. Furthermore, it will be understood that the present disclosure should not be construed as being limited to the embodiments set forth herein, and the embodiments of the present disclosure are provided only to completely include the present disclosure and cover modifications, equivalents or alternatives which come within the scope and technical range of the present disclosure.

In the following description of the embodiments, terms, such as "first" and "second", are used only to describe various elements, and these elements should not be construed as being limited by these terms. These terms are used only to distinguish one element from other elements. For example, a first element described hereinafter may be termed a second element, and similarly, a second element described hereinafter may be termed a first element, without departing from the scope of the present disclosure.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present. Other words used to describe relationships between elements should be interpreted in a like fashion, e.g., "between" versus "directly between," "adjacent" versus "directly adjacent," etc.

Wherever possible, the same reference numbers will be used throughout the drawings to refer to the same or like parts. The terminology used herein is for describing various exemplary embodiments only and is not intended to be limiting. As used herein, singular forms may be intended to include plural forms as well, unless the context clearly indicates otherwise. The terms "comprises," "comprising," "including," and "having" are inclusive and therefore specify the presence of stated features, integers, operations, operations, elements, components, and/or combinations thereof, but do not preclude the presence or addition of one or more other features, integers, operations, operations, elements, components, and/or combinations thereof.

Figure 2:
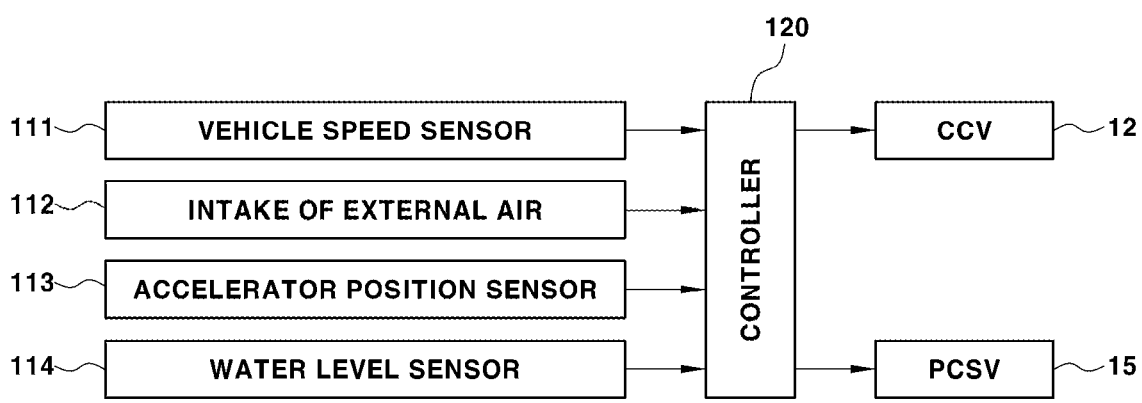
FIG. 2 is a block diagram showing the configuration of an apparatus for controlling a fuel system of a vehicle according to an exemplary embodiment of the present disclosure.
Figure 3:
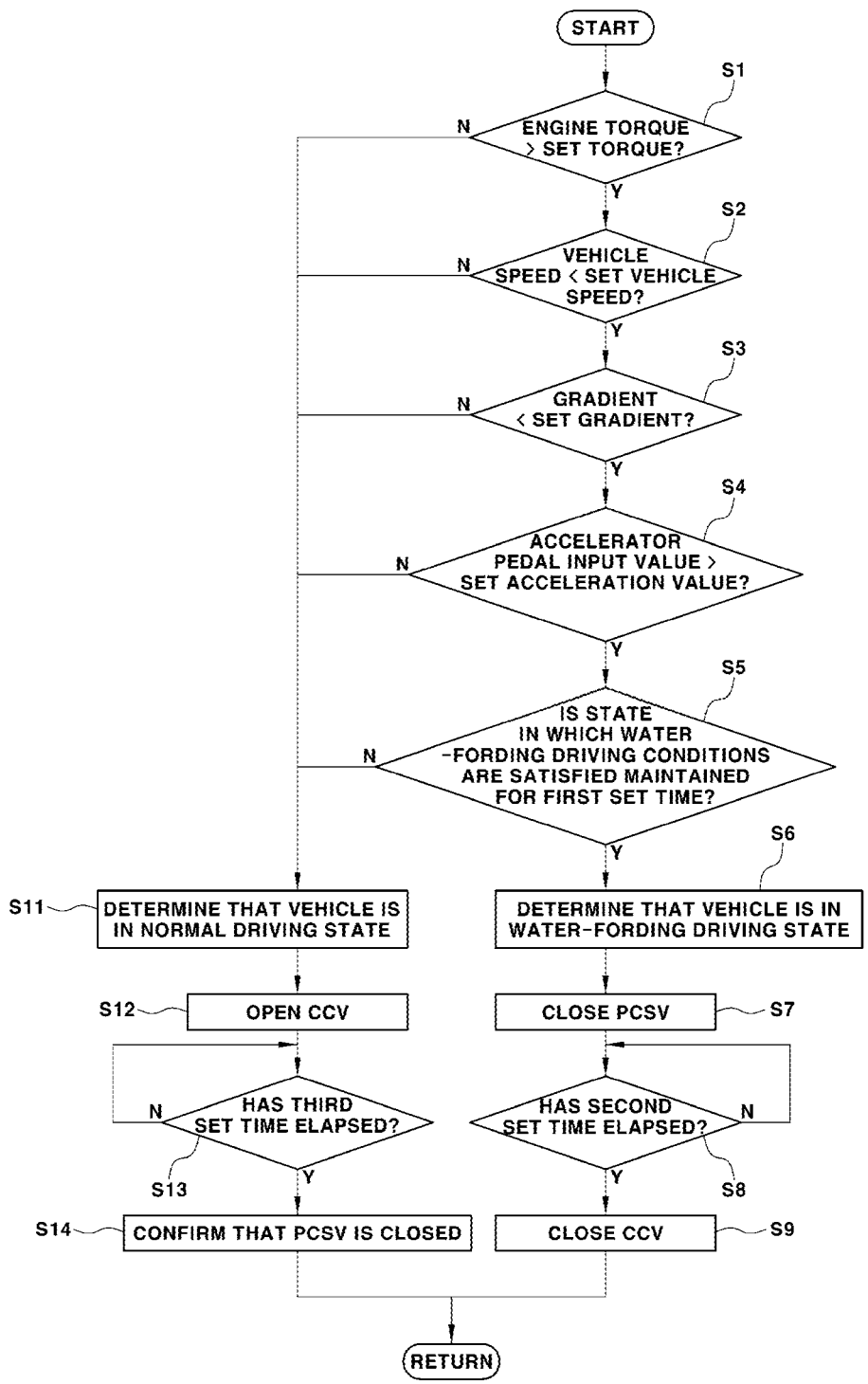
FIG. 3 is a flowchart showing a method of controlling the fuel system of the vehicle according to an exemplary embodiment of the present disclosure.
Figure 4:
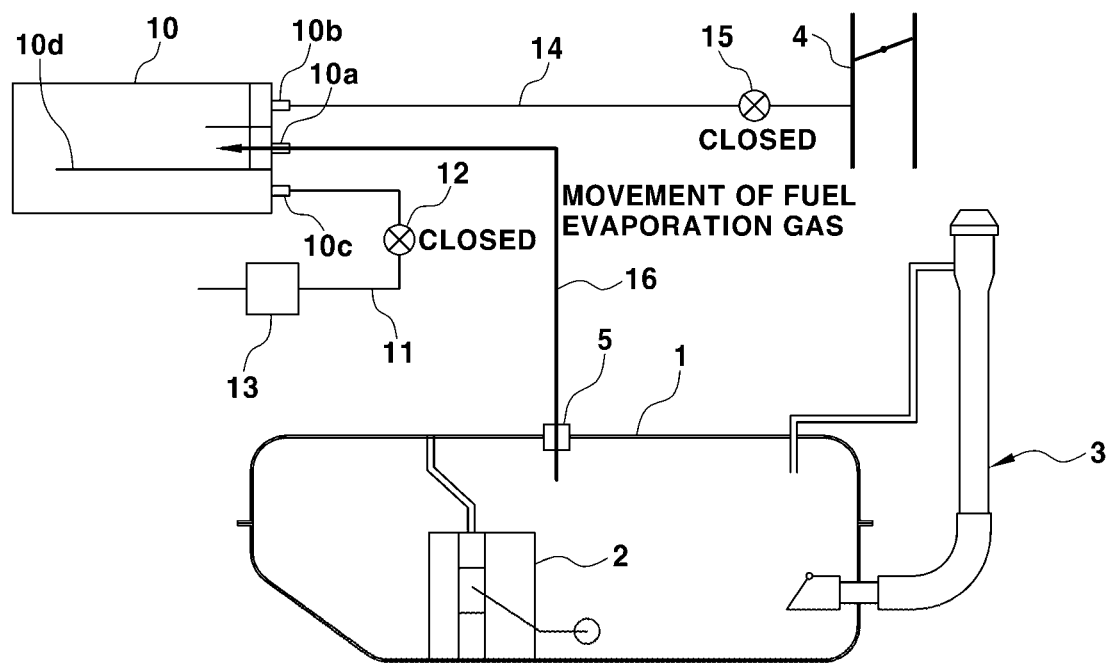
FIG. 4 is a diagram showing a control state of the fuel system during water-fording driving of the vehicle.

The present disclosure is intended to provide an apparatus and method for controlling a fuel system of a vehicle which may prevent water from flowing into an engine through the fuel system during water-fording driving of the vehicle. FIG. 2 is a block diagram showing the configuration of the apparatus for controlling the fuel system of the vehicle according to an exemplary embodiment of the present disclosure, FIG. 3 is a flowchart showing the method of controlling the fuel system of the vehicle according to an exemplary embodiment of the present disclosure, and FIG. 4 is a diagram showing a control state of the fuel system during water-fording driving of the vehicle.

In the following description, FIG. 1 will be referred to for the configuration of the fuel system of the vehicle to which the present disclosure is applied, i.e., the fuel system including a fuel evaporation gas treatment device. Furthermore, because there is no difference in a purge operation control state during normal driving of the vehicle compared to the state of FIG. 1, FIG. 1 will be referred to for a description of the purge operation control state during normal driving.

In an exemplary embodiment of the present disclosure, normal driving refers to a case in which the vehicle drives on a road in a normal state, and means a case in which the vehicle is driving on a normal road rather than driving while fording water. Water-fording driving refers to a case in which the vehicle is driving to pass a point or place with a water level greater than or equal to a predetermined level, for example, a case in which the vehicle is driving to pass a river or a road with a high water level.

As described above, the fuel system of the vehicle includes the fuel evaporation gas treatment device which treats and is configured to control fuel evaporation gas (HC gas) generated from the fuel tank 1. In an exemplary embodiment of the present disclosure, operating elements of the fuel evaporation gas treatment device are controlled to prevent water from entering the fuel tank 1 and ultimately to prevent water from flowing into the engine.

For the present purpose, in an exemplary embodiment of the present disclosure, a controller 120 of the vehicle is configured to determine whether the vehicle is in a water-fording driving state based on information collected from the vehicle, and closes the canister close valve (referred to hereinafter as "CCV") 12 electrically connected to the controller 120 so that the fuel system including the fuel evaporation gas treatment device includes a sealed structure, upon determining that the vehicle is in the water-fording driving state.

Here, the controller 120 may also close the purge control solenoid valve (referred to hereinafter as "PCSV") 15 and may thus seal the fuel system including the fuel evaporation gas treatment device and the fuel tank 1 to prevent water from flowing into the engine through the fuel system.

During normal driving, while the engine runs in the state in which the CCV 12 and the PCSV 15 are opened, suction pressure, i.e., engine negative pressure, is applied to the inside of the canister 10 from the engine intake system 4 through the purge port 10*b*, and external air is drawn into the canister 10 through the air filter 13, the CCV 12, and the atmospheric port 10*c* by the present engine negative pressure.

Because the CCV 12 is always open except when diagnosing a leak, as shown in FIG. 1, during the purge operation, external air drawn through the CCV 12 may flow into the engine intake system 4 through the canister 10.

At the present time, while external air drawn through the CCV 12 passes through the inside of the canister 10, the fuel evaporation gas may be desorbed from the adsorbent material, and the desorbed fuel evaporation gas may be discharged from the canister 10 through the purge port 10*b*, may be drawn into the engine intake system 4, and may be burned in the engine.

On the other hand, in an exemplary embodiment of the present disclosure, during water-fording driving of the vehicle, the CCV 12 provided on the atmospheric line 11 is closed, and therefore, water may not flow into the canister 10 through the air filter 13 and the CCV 12. At the instant time, the controller 10 may first close the PCSV 15, and may then the CCV 12.

When the CCV 12 and the PCSV 15 are closed, the fuel system including the fuel evaporation gas treatment device is in the sealed state, and accordingly, water from the outside thereof may not enter the canister 10 through the air filter 13 and the CCV 12, and even while the vehicle is driving while fording water, water may be prevented from flowing into the fuel tank 1 or the engine through the fuel evaporation gas treatment device.

Hereinafter, a process in which the controller 120 is configured to determine whether the vehicle is in the water-fording driving state based on the information collected from the vehicle will be described.

The controller 120 may be configured to determine whether the vehicle is driving while fording water based on real-time information collected from the vehicle, specifically vehicle driving information indicating a vehicle driving state. Here, the vehicle driving information for determining whether the vehicle is driving while fording water may include an engine torque, a vehicle speed, a gradient of a place where the vehicle is driving, and an accelerator pedal input value (APS value).

The engine torque, which is an engine torque to satisfy a driver's requested torque, may a torque value corresponding to an engine torque command, and the vehicle speed, the gradient, and the accelerator pedal input value may be sensor detection values which are detected by sensors. In general, the controller 120 of the vehicle is configured to determine the driver's requested torque depending on a driver's driving intention based on the vehicle driving information, such as the accelerator pedal input value, input by a driver, and the vehicle speed, and generates the engine torque command to control operation of the engine based on the driver's requested torque.

During water-fording driving of the vehicle, i.e., when the vehicle passes through a point with a water level greater than or equal to a certain level, an excessive driving load is generated and applied to the vehicle, and thus, a large engine torque is required. For example, during water-fording driving of the vehicle, the driver generally depresses an accelerator pedal to 80% or more, and therefore, the engine torque reaches 70% to 80% of the maximum engine torque.

Therefore, water-fording driving conditions may include a condition in which the engine torque (command value) exceeds a predetermined torque (Operation S1 in FIG. 3), and as one of the water-fording driving conditions, the condition in which the engine torque (command value) exceeds the predetermined torque may be set in the controller 120.

Furthermore, the vehicle speed may be detected by a vehicle speed sensor 111, and a wheel speed sensor may be used as the vehicle speed sensor 111. A method of determining and obtaining real-time vehicle speed information from a signal from the wheel speed sensor by the controller 120 is well known, and a detailed description thereof will thus be omitted.

When the vehicle is driving while fording water, an excessive driving load is applied to the vehicle, and even if the accelerator pedal is depressed to 80% or more, the vehicle speed does not exceed a maximum of 15 km/h. Therefore, the water-fording driving conditions may further include a condition in which the vehicle speed is less than a predetermined vehicle speed (Operation S2 in FIG. 3), and as one of the water-fording driving conditions, the condition in which the vehicle speed is less than the predetermined vehicle speed may be set in the controller 120.

The gradient of the place where the vehicle is driving may also be detected by a sensor, i.e., a gradient sensor 112, of the vehicle, and an acceleration sensor which detects the longitudinal acceleration of the vehicle may be used as the gradient sensor 112 configured to detect the gradient of the place where the vehicle is driving.

A method of determining and obtaining real-time gradient information from a signal from the acceleration sensor by the controller 120 is well known, and a detailed description thereof will thus be omitted. Furthermore, any known sensor which may detect gradient information of the place where the vehicle is driving may be used.

In an exemplary embodiment of the present disclosure, if the vehicle is in an uphill driving condition in which the vehicle speed is low and an excessive engine torque is required, the vehicle may be prevented from entering a water-fording diving mode in which the sealed structure of the fuel system is generated. Therefore, the water-fording driving conditions may further include a condition in which the gradient of the place where the vehicle is driving is less than a predetermined gradient (Operation S3 in FIG. 3), and as one of the water-fording driving conditions, the condition in which the gradient of the place where the vehicle is driving is less than the predetermined gradient may be set in the controller 120.

The accelerator pedal input value may be detected by an accelerator position sensor (or accelerator pedal sensor, APS) 113, and the accelerator position sensor 113 is provided to output an electrical signal depending on the operation state of the accelerator pedal by the driver. Accordingly, the controller 120 may obtain information related to the accelerator pedal input value (APS value, %) depending on the operation state of the accelerator pedal by the driver from the signal from the accelerator position sensor 113.

When the vehicle is driving while fording water, the driver operates the accelerator pedal, and therefore, the vehicle may enter the water-fording driving mode only when the opening amount of the accelerator pedal is a predetermined level or more. That is, the water-fording driving conditions may further include a condition in which the accelerator pedal input value (APS value, %) exceeds a predetermined acceleration value (Operation S4 in FIG. 3), and as one of the water-fording driving conditions, the condition in which the accelerator pedal input value exceeds the predetermined acceleration value may be set in the controller 120.

In an exemplary embodiment of the present disclosure, the controller 120 may be an engine management system (EMS), or may be a separate controller distinguished from the engine management system. In an exemplary embodiment of the present disclosure, the controller 120 is configured to determine whether the current driving state of the vehicle satisfies the above water-fording driving conditions based on the vehicle driving information received from driving information detectors, or the driving information detectors and other controllers through a vehicle CAN network.

Here, the vehicle driving information required to determine whether the current driving state of the vehicle satisfies the above water-fording driving conditions may include the above-described engine torque, vehicle speed, gradient of the place in which the vehicle drives, and driver's accelerator pedal input value, and the driving information detectors configured to detect real-time vehicle driving information indicating the driving state of the vehicle may include the above-described vehicle sensor 111, gradient sensor 112, and accelerator position sensor 113.

Furthermore, in an exemplary embodiment of the present disclosure, the controller 120 may use a self-determined engine torque or engine torque information received from other controllers through CAN communication, among the vehicle driving information required to determine whether the current driving state of the vehicle satisfies the water-fording driving conditions.

In an exemplary embodiment of the present disclosure, the controller 120 may be set to determine that the vehicle is currently driving while fording water (Operation S6), if the current driving state of the vehicle satisfies all of the above-described four water-fording driving conditions, i.e., the engine torque condition (Operation S1 in FIG. 3), the vehicle speed condition (Operation S2 in FIG. 3), the gradient condition (Operation S3 in FIG. 3), and the accelerator pedal input value condition (Operation S4 in FIG. 3) based on vehicle driving information collected in real time, and the state in which the current driving state of the vehicle satisfies all of the water-fording driving conditions is maintained for a first set time (for example, 20 ms to 40 ms) (Operation S5 in FIG. 3).

For example, the controller 120 may be set to determine that the vehicle is in the water-fording driving state, if the state in which the current driving state of the vehicle satisfies all of the water-fording driving conditions, that is, the condition in which the engine torque exceeds the predetermined torque of 70% of the maximum engine torque, the condition in which the vehicle speed is less than the predetermined vehicle speed of 10 km/h, the condition in which the gradient of the place where the vehicle is driving is less than the predetermined gradient of 2%, and the condition in which the accelerator pedal input value (APS value, %)

exceeds the predetermined acceleration value of 80%, is maintained for the first set time (Operations S1 to S6 in FIG. 3).

When the vehicle is driving while fording water, because the vehicle may overcome the pressure of a high water level even though the vehicle is driving at low speed and low gradient conditions, the driver's accelerator pedal input value (the opening amount of the accelerator pedal) is very large, and a very large engine torque is also required.

The above-described predetermined torque, predetermined vehicle speed, predetermined gradient, and predetermined acceleration value are exemplary and thus the present disclosure is not limited thereby, and these set values may be variously changed and tuned depending on required water-fording driving performance, a vehicle type, or the like.

Furthermore, if the controller determines that the vehicle is currently driving while fording water (Operation S6), the controller 120 may allow the vehicle to enter the water-fording driving mode and control the PCSV 15 to be closed (Operation S7), may determine whether a second set time has elapsed (Operation S8), and may then control the CCV 12 to be closed after the second set time (Operation S9).

Upon determining that the vehicle is currently driving while fording water, the controller 120 first confirms the closed state of the PCSV 15, and then controls the CCV 12 to be closed. If the CCV 12 is first closed and then the PCSV 15 is closed, unnecessary engine negative pressure may be applied to the fuel system, and in the instant case, moisture from the purge line may flow into the engine due to the engine negative pressure.

Accordingly, in an exemplary embodiment of the present disclosure, the PCSV 15 and the CCV 12 are controlled to be sequentially closed to seal the fuel system including the fuel evaporation gas treatment device during water-fording driving of the vehicle. The PCSV 15 and the CCV 12 are electronic valves, opening and closing operations of which are controlled depending on a control signal from the controller 120, and both valves may be solenoid valves operated in the solenoid method.

In an exemplary embodiment of the present disclosure, the purpose of controlling the two valves to be closed during water-fording driving of the vehicle is to seal the fuel system so that water flowing into the atmospheric port connected to the CCV 12 due to the engine negative pressure (intake negative pressure) is prevented from moving to the fuel tank 1 and then flowing into the engine during water-fording driving of the vehicle.

The controller 120 may be set to maintain the open state of the CCV 12 (Operation S12), upon determining that the vehicle is not currently in the water-fording driving state (Operation S11 in FIG. 3). Of course, during the purge operation to remove the fuel components adsorbed in the canister 10, the controller 120 opens the PCSV 15, as known.

If the vehicle driving while fording water enters the water-fording mode and then the water-fording driving state of the vehicle is released, i.e., if the vehicle does not satisfy the water-fording driving conditions any more, enters a normal road, and switches to a normal driving mode, the controller 120 opens the closed CCV 12 (Operation S12), determines whether a third set time has elapsed (Operation S13), and confirms whether the PCSV 15 is closed after the third set time so that, if the PCSV 15 is closed, the closed state of the PCSV 15 is maintained, and if the PCSV 15 is opened, the PCSV 15 is controlled to be closed (Operation S14).

Here, the normal driving mode is a mode which the vehicle enters when the vehicle does not satisfy the water-fording driving conditions, and in the normal driving mode, control for leak diagnosis and purge operation for the fuel system may be performed.

Figure 5:
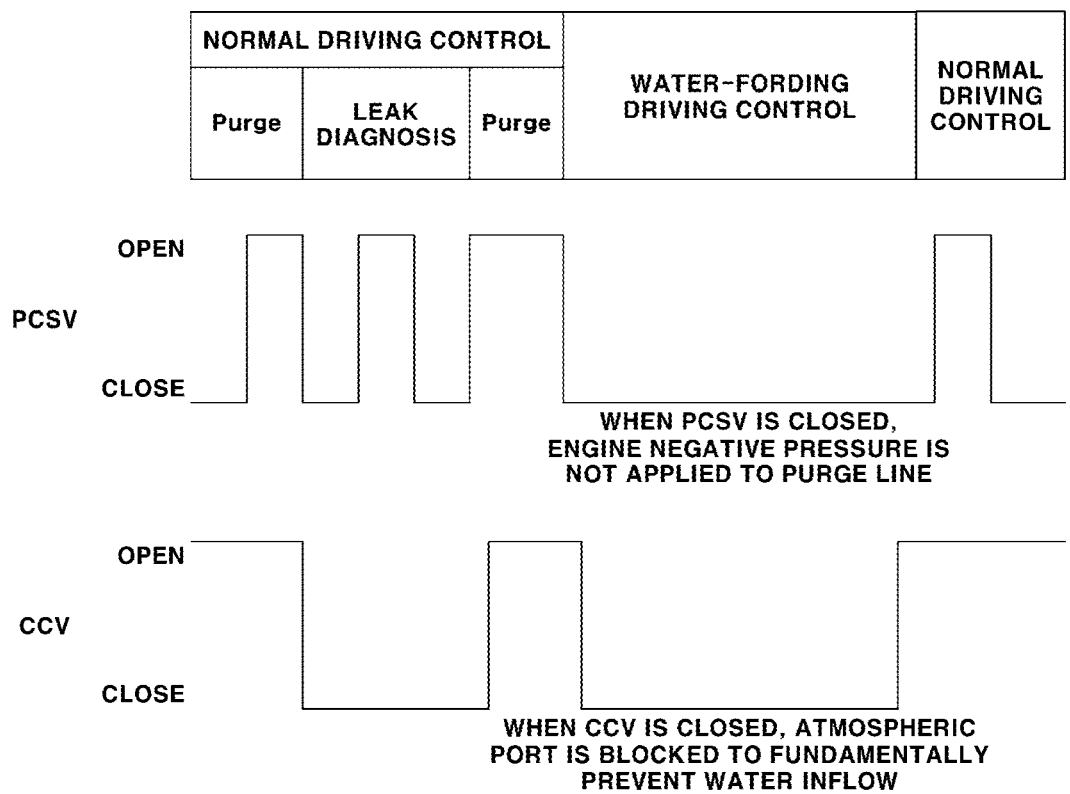
FIG. 5 is a diagram showing control states of a PCSV and a CCV depending on the operating mode of a fuel evaporation gas treatment device according to an exemplary embodiment of the present disclosure.

FIG. 5 is a diagram showing the control states of the PCSV and the CCV depending on the operating mode of the fuel evaporation gas treatment device according to an exemplary embodiment of the present disclosure. As shown in the present figure, during the purge operation of the fuel evaporation gas treatment device, both the PCSV 15 and the CCV 12 are controlled to be in the open state.

During a purge process, both the PCSV 15 and the CCV 12 are opened so that, when the engine intake negative pressure is applied to the canister 10, external air flows into the canister 10 through the CCV 12. The external air flowing into the canister 10 desorbs and separates the fuel evaporation gas from the adsorbent material of the canister 10, and the desorbed and separated fuel evaporation gas together with air is drawn from the canister 10 into the engine intake system 4. The fuel evaporation gas, drawn into the engine intake system 4, together with air is drawn into the engine, and is then burned.

On the other hand, when diagnosing a leak using the on-board diagnostics (OBD), the PCSV 15 is controlled to be in the open state and the CCV 12 is controlled to be in the closed state (cut-off state), and when performing the purge operation again after leak diagnosis, both the PCSV 15 and the CCV 12 are controlled to be in the open state.

In the present way, when diagnosing a leak, the PCSV 15 is opened to generate negative pressure in the fuel system including the fuel tank 1 due to the engine intake negative pressure, and the CCV 12 is controlled to be in the closed state to cut off inflow of external air and to generate negative pressure in the fuel system including the fuel tank 1.

Furthermore, if the controller 120 determines that the current driving state of the vehicle satisfies the water-fording driving conditions from the vehicle driving information, the controller 120 allows the vehicle to enter the water-fording driving mode, first controls the PCSV 15 to be in the closed state, and then controls the CCV 12 to be in the closed state after the second set time (for example, 20 ms).

When the PCSV 15 is closed, an engine load is not applied to the purge line. Furthermore, when the CCV 12 is closed, the atmospheric port is blocked and thus inflow of water may be prevented.

Thereafter, when the water-fording driving mode is released and the vehicle is returned to the normal driving mode, the controller 120 may be configured for controlling the CCV 12 to be in the open state, and thereafter, during the purge operation, the controller 120 may be configured for controlling the PCSV 15 to also be in the open state. Here, the CCV 12 may be opened first, and the PCSV 15 may be opened later.

Figure 6:
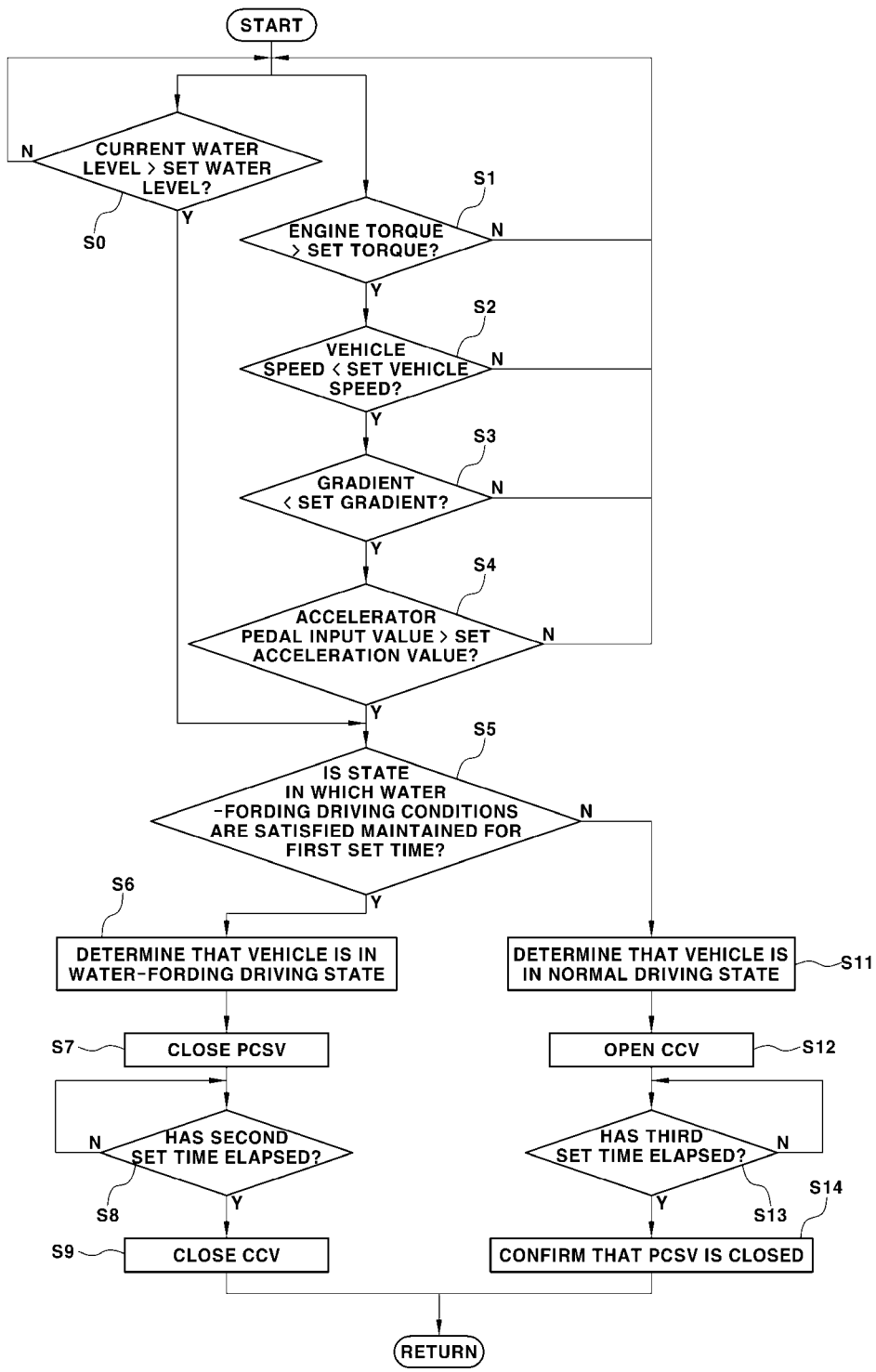
FIG. 6 is a flowchart showing a method of controlling the fuel system of the vehicle using water level sensors according to an exemplary embodiment of the present disclosure.

FIG. 6 is a flowchart showing a method of controlling the fuel system of the vehicle using water level sensors according to an exemplary embodiment of the present disclosure. In an exemplary embodiment of the present disclosure, the driving information detectors which detect the vehicle driving information required to determine whether the current driving state of the vehicle satisfies the water-fording driving condition may further include water level sensors 114 which are electrically connected to the controller 120 and detect the water level of the place where the vehicle is driving. In an exemplary embodiment of the present disclosure, in the case of a vehicle to which a water level sensor is applied, the detected value of the water level sensor may be used to determine whether the vehicle is driving while fording water.

The water level sensors 114 may be provided in the vehicle to detect a water level in the place where the vehicle is currently driving, and in an exemplary embodiment of the present disclosure, one of known sensors which may detect a water level in a vehicle during water-fording driving, such as a float-type sensor including a float provided in a tank provided at a predetermined height in a vehicle so that water may flow into the vehicle, similar to a fuel level sensor, or a non-contact sensor which may detect a water level in a non-contact manner, may be used as the water level sensors 114.

Alternatively, the water level sensors 114 may include an upper water level sensor and a lower water level sensor, and the upper water level sensor and the lower water level sensor may be provided to detect a water level when water reaches a height at which each of the corresponding water level sensors is located, and to output an electrical signal.

In an exemplary embodiment of the present disclosure, the controller 120 may be configured to determine whether the vehicle is driving while fording water from signals from the water level sensors 114, and in the instant case, may be configured to determine whether the vehicle is driving while fording water by comparing the water levels detected by the water level sensors 144 with set water levels.

Here, because the water level during water-fording driving of the vehicle is bound to fluctuate greatly depending on water current, it is necessary to apply hysteresis to determine whether the vehicle is driving while fording water. That is, a first set water level L and a second set water level R may be set in the controller 120 as pre-tuned values through a preceding test and evaluation process depending on each vehicle type, and the second set water level R may be set to a larger value than the first set water level L. Here, the lower water level sensor may be provided at the height of the first set water level, and the upper water level sensor may be provided at the second set water level.

If it is detected that a current water level is equal to or greater than the second set water level R from a signal from the upper water level sensor (Operation S0 in FIG. 6), the controller 120 may be configured to determine that the current driving state of the vehicle satisfies the water-fording driving conditions.

After determining that the vehicle is in the water-fording driving state, if it is detected that the current water level is equal to or lower than the first set water level L from a signal from the lower water level sensor, the controller 120 may be configured to determine that the water-fording driving state of the vehicle is released.

For example, when the first set water level L is set to 300 mm and the second set water level R is set to 500 mm, if the controller 120 confirms that the current water level is raised to the second set water level, i.e., 500 mm, or more from the signal from the upper water level sensor, the controller 120 may be configured to determine that the current driving state of the vehicle satisfies the water-fording driving conditions.

Furthermore, after determining that the vehicle is in the water-fording driving state, if the controller 120 confirms that the current water level is lowered to the second set water level, i.e., 300 mm, or less from the signal from the lower water level sensor, the controller 120 may be configured to determine that the water-fording driving state of the vehicle is released. If the value of the water level detected by the water level sensors 114 is greater than 300 mm but less than 500 mm due to water current during the water-fording driving mode, such a change is determined as a water level change due to the water current.

If the water level sensors 114 are used in the present way, the water-fording driving conditions may further include the condition in which the current water level is raised to the set water level (the second set water level) or more, in addition to the above-described four conditions, i.e., the engine torque condition, the vehicle speed condition, the gradient condition, and the accelerator pedal input value condition. Accordingly, the water-fording driving conditions include a total of five conditions.

In the instant case, if the current driving state of the vehicle satisfies all of the engine torque condition (Operation S1 in FIG. 6), the vehicle speed condition (Operation S2 in FIG. 6), the gradient condition (Operation S3 in FIG. 6), and the accelerator pedal input value condition (Operation S4 in FIG. 6) among the above-described five water-fording driving conditions, or satisfies the condition in which the current water level is raised to the set water level (the second set water level) or more (Operation S0 in FIG. 6) among the above-described five water-fording driving conditions, the controller 120 may be configured to determine that the current vehicle driving state satisfies the water-fording driving conditions. Thereafter, when a first set time has elapsed in the state in which the vehicle driving state satisfies the water-fording driving conditions (Operation S5 in FIG. 6), the controller 120 finally determines that the vehicle is in the water-fording driving state (Operation S6) to allow the vehicle to enter the water-fording driving mode.

Thereafter, a process of controlling the respective valves 12 and 15 in the water-fording driving mode which the vehicle enters if it is determined that the vehicle is in the water-fording driving state and a process of controlling the respective valves 12 and 15 in the normal driving mode which the vehicle enters when the controller concludes that the vehicle is not in the water-fording driving state do not differ from the processes described above with reference to FIG. 3 and FIG. 4, and a description thereof will thus be omitted to avoid redundant description.

As is apparent from the above description, in an apparatus and method for controlling a fuel system of a vehicle according to an exemplary embodiment of the present disclosure, if it is determined that the vehicle is driving while fording water, a canister close valve (CCV) and a purge control solenoid valve (PCSV) are closed to seal the fuel system, being configured for firmly preventing water from flowing into an engine through the fuel system.

Furthermore, the term related to a control device such as "controller", "control apparatus", "control unit", "control device", "control module", "control circuit", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured for processing data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

Hereinafter, the fact that pieces of hardware are coupled operably may include the fact that a direct and/or indirect connection between the pieces of hardware is established by wired and/or wirelessly.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus for controlling a fuel system of a vehicle, the apparatus comprising:
    driving information detectors provided to detect vehicle driving information required to determine whether the vehicle is driving while fording water;
    a controller operably connected to the driving information detectors and provided to determine whether a current driving state of the vehicle satisfies predetermined water-fording driving conditions based on the vehicle driving information detected by the driving information detectors;
    a canister close valve provided on an atmospheric line between a canister and an atmospheric side; and
    a purge control solenoid valve provided on a purge line connecting the canister and an engine intake system,
    wherein, upon concluding that the current driving state of the vehicle satisfies the predetermined water-fording driving conditions, the controller is configured to conclude that the vehicle is in a water-fording driving state and output a control signal to seal the fuel system, and the canister close valve and the purge control solenoid valve are controlled to be in a closed state depending on the control signal to seal the fuel system, output by the controller.

2. The apparatus of claim 1,
wherein the vehicle driving information detected by the driving information detectors includes a vehicle speed, a gradient of a place where the vehicle is driving, and a driver's accelerator pedal input value,
wherein the driving information detectors include:
   a vehicle speed sensor configured to detect the vehicle speed;
   a gradient sensor configured to detect the gradient of the place where the vehicle is driving; and
   an accelerator position sensor configured to detect the driver's accelerator pedal input value.

3. The apparatus of claim 2, wherein the predetermined water-fording driving conditions set in the controller include:
   an engine torque condition in which an engine torque configured to satisfy a driver's requested torque exceeds a predetermined torque;
   a vehicle speed condition in which the detected vehicle speed is less than a predetermined vehicle speed;
   a gradient condition in which the detected gradient is less than a predetermined gradient; and
   an accelerator pedal input value condition in which the detected driver's accelerator pedal input value exceeds a predetermined acceleration value.

4. The apparatus of claim 3, wherein, in response that all of the engine torque condition, the vehicle speed condition, the gradient condition, and the accelerator pedal input value condition are satisfied, the controller is configured to conclude that the current driving state of the vehicle satisfies the predetermined water-fording driving conditions.

5. The apparatus of claim 1,
wherein the vehicle driving information detected by the driving information detectors includes a vehicle speed, a gradient of a place where the vehicle is driving, a driver's accelerator pedal input value, and a water level of the place where the vehicle is driving, and
wherein the driving information detectors include:
   a vehicle speed sensor configured to detect the vehicle speed;
   a gradient sensor configured to detect the gradient of the place where the vehicle is driving;
   an accelerator position sensor configured to detect the driver's accelerator pedal input value; and
   a water level sensor configured to detect the water level of the place where the vehicle is driving.

6. The apparatus of claim 5, wherein the predetermined water-fording driving conditions set in the controller include:
   an engine torque condition in which an engine torque configured to satisfy a driver's requested torque exceeds a predetermined torque;
   a vehicle speed condition in which the detected vehicle speed is less than a predetermined vehicle speed;
   a gradient condition in which the detected gradient is less than a predetermined gradient;
   an accelerator pedal input value condition in which the detected driver's accelerator pedal input value exceeds a predetermined acceleration value; and
   a water level condition in which the detected water level is equal to or greater than a set water level.

7. The apparatus of claim 6, wherein, in response that all of the engine torque condition, the vehicle speed condition, the gradient condition, and the accelerator pedal input value condition are satisfied, or in response that the water level condition is satisfied, the controller is configured to conclude that the current driving state of the vehicle satisfies the predetermined water-fording driving conditions.

8. The apparatus of claim 1, wherein, in response that a state in which the current driving state of the vehicle satisfies the predetermined water-fording driving conditions is maintained for a first set time, the controller is configured to conclude that the vehicle is in the water-fording driving state.

9. The apparatus of claim 8, wherein, in response that the controller is configured to conclude that the vehicle is in the water-fording driving state, the controller:
   first controls the purge control solenoid valve to be in the closed state; and
   then controls the canister close valve to be in the closed state, after a second set time has elapsed.

10. A method of controlling a fuel system of a vehicle, the method comprising:
   obtaining, by a controller, vehicle driving information required to determine whether the vehicle is driving while fording water through driving information detectors operably connected to the controller;
   determining, by the controller, whether a current driving state of the vehicle satisfies predetermined water-fording driving conditions based on the obtained vehicle driving information;
   concluding, by the controller, that the vehicle is in a water-fording driving state and outputting a control signal to seal the fuel system, upon concluding that the current driving state of the vehicle satisfies the predetermined water-fording driving conditions; and
   controlling a canister close valve provided on an atmospheric line between a canister and an atmospheric side and a purge control solenoid valve provided on a purge line connecting the canister and an engine intake system to be in a closed state depending on the control signal output by the controller.

11. The method of claim 10, wherein the vehicle driving information detected by the driving information detectors includes a vehicle speed, a gradient of a place where the vehicle is driving, and a driver's accelerator pedal input value.

12. The method of claim 11, wherein the predetermined water-fording driving conditions set in the controller include:
   an engine torque condition in which an engine torque configured to satisfy a driver's requested torque exceeds a predetermined torque;
   a vehicle speed condition in which the detected vehicle speed is less than a predetermined vehicle speed;
   a gradient condition in which the detected gradient is less than a predetermined gradient; and
   an accelerator pedal input value condition in which the detected driver's accelerator pedal input value exceeds a predetermined acceleration value.

13. The method of claim 12, wherein, in response that all of the engine torque condition, the vehicle speed condition, the gradient condition, and the accelerator pedal input value condition are satisfied, the controller is configured to conclude that the current driving state of the vehicle satisfies the predetermined water-fording driving conditions.

14. The method of claim 10, wherein the vehicle driving information detected by the driving information detectors includes a vehicle speed, a gradient of a place where the vehicle is driving, a driver's accelerator pedal input value, and a water level of the place where the vehicle is driving.

15. The method of claim 14, wherein the predetermined water-fording driving conditions set in the controller include:
- an engine torque condition in which an engine torque configured to satisfy a driver's requested torque exceeds a predetermined torque;
- a vehicle speed condition in which the detected vehicle speed is less than a predetermined vehicle speed;
- a gradient condition in which the detected gradient is less than a predetermined gradient;
- an accelerator pedal input value condition in which the detected driver's accelerator pedal input value exceeds a predetermined acceleration value; and
- a water level condition in which the detected water level is equal to or greater than a set water level.

16. The method of claim 15, wherein, in response that all of the engine torque condition, the vehicle speed condition, the gradient condition, and the accelerator pedal input value condition are satisfied, or in response that the water level condition is satisfied, the controller is configured to conclude that the current driving state of the vehicle satisfies the predetermined water-fording driving conditions.

17. The method of claim 10, wherein, in response that a state in which the current driving state of the vehicle satisfies the predetermined water-fording driving conditions is maintained for a first set time, the controller is configured to conclude that the vehicle is in the water-fording driving state.

18. The method of claim 17, wherein, in response that the controller is configured to conclude that the vehicle is in the water-fording driving state, the controller:
- first controls the purge control solenoid valve to be in the closed state; and
- then controls the canister close valve to be in the closed state, after a second set time has elapsed.

19. A non-transitory computer readable storage medium on which a program for performing the method of claim 10 is recorded.

* * * * *